US005398782A

United States Patent [19]

Talbot et al.

[11] Patent Number: 5,398,782

[45] Date of Patent: Mar. 21, 1995

[54] REMOTE MONITORING SYSTEM WITH VARIABLE PERIOD COMMUNICATION CHECK

[75] Inventors: Samuel Talbot, Chester; Theresa M. Christy, West Hartford, both of Conn.; Joseph Kronen, Kanagawa, Japan; Ronald R. Pepin, Windsor Locks, Conn.

[73] Assignee: Otis Elevator Company, Farmington, Conn.

[21] Appl. No.: 151,716

[22] Filed: Nov. 12, 1993

[51] Int. Cl.[6] .............................................. B60B 3/00

[52] U.S. Cl. .................................... 187/393; 187/247

[58] Field of Search ............... 187/140, 130, 133, 100, 187/101; 340/516, 525.16

[56] References Cited

U.S. PATENT DOCUMENTS 4,568,909 2/1986 Whynacht .............................. 340/2
4,622,538 11/1986 Whynacht et al. ................. 340/506
4,703,325 10/1987 Chamberlin et al. .......... 340/825.17
4,771,865 9/1988 Hinderling .......................... 187/130
4,930,604 6/1990 Schienda et al. .................. 187/133
5,064,026 11/1991 Nagata et al. ....................... 187/130

OTHER PUBLICATIONS

Article entitled "Elevator Monitoring and Command System" by Kone EMC (5 pages).

*Primary Examiner*—Steven L. Stephan
*Assistant Examiner*—Robert Nappi
*Attorney, Agent, or Firm*—Joseph P. Abate

[57] ABSTRACT

A remote elevator monitoring system includes a master associated with a building and a local connected to the master. The local includes an electronic processor which executes instructions for determining whether the master has transmitted a signal packet to the local within a time period selectable at will by an operator at the local. The time period is, for example, a period selected within a range of 0–255 days. Optionally, for example, the master is programmed to transmit a signal packet to the local at a selected time on the last day of the selected time period.

7 Claims, 9 Drawing Sheets

BELOW IS THE OUTLINE OF A TYPICAL MESSAGE SIGNAL PACKET P SENT FROM A REM MASTER TO A REM LOCAL. THE BLOCKS REPRESENT DIFFERENT FIELDS, OR PIECES OF INFORMATION THAT ARE TRANSMITTED.

ALARM SIGNAL PACKET FOR REMS — PACKET LENGTH = e.g.30 BYTES — P

| LEVEL III & LEVEL II | | FUNC | MASTER ID | VERSION ID | | ALARM CODE | FAULT CODE | TIME STAMP | | |
|---|---|---|---|---|---|---|---|---|---|---|
| | | 7DH | | | | | | | | |
| (12) | | (1) | (2) | (4) | | (2) | (1) | (6) | | |

FIELD DESCRIPTIONS:

LEVEL III & LEVEL II: THESE TWELVE BYTES ARE GENERAL COMMUNICATIONS HANDSHAKING FIELDS LIKE SOURCE, DESTINATION, LENGTH OF MESSAGE, etc.

FUNC: THIS BYTE IDENTIFIES THE TYPE OF MESSAGE BEING SENT. AS YOU CAN SEE ABOVE A MASTER INITIATED MESSAGE IS IDENTIFIED BY 7D HEX.

MASTER ID: THESE TWO BYTES CONTAIN THE NUMBER OF THE MASTER THAT ORIGINATED THE MESSAGE. THIS TELLS THE LOCAL WHERE IT CAME FROM.

VERSION ID: THESE FOUR BYTES ARE USED TO DIFFERENTIATE BETWEEN DIFFERENT TYPES, OR VERSIONS OF MASTERS.

ALARM CODE: THIS FIELD IS USED TO INDICATE THE TYPE OF THE MESSAGE.

FAULT CODE: THIS FIELD IS USED TO INDICATE THE SUBTYPE OF THE ALARM. WHERE THE ALARM CODE FIELD MAY BE THE SAME FOR SEVERAL DIFFERENT ALARMS, THOSE ALARMS WILL ALL HAVE DIFFERENT FAULT CODES.

TIME STAMP: THIS FIELD CONTAINS THE ACTUAL TIME AND DATE WHEN THE MESSAGE WAS CREATED.

FIG.2
Prior Art

T

REM ALERTS AND ALARMS

| ALARM CODE | FLT CODE | MESS NUM | ALARM MESSAGE |
| --- | --- | --- | --- |
| | | | ALARM CONDITION CORRECTED |
| | | | INOPERATIVE UNOCCUPIED WITH INVALID FAULT CODE |
| 1 | 0 | 1 | INOP 1 ELEVATOR POWER SIGNAL FAILURE |
| | | | INOP 2 HOISTWAY DOOR LOCK SIGNAL FAILURE |
| ⋮ | ⋮ | ⋮ | ⋮ |
| 2 | 33 | 34 | SER TRAPPED PASSENGER – MAINTENANCE |

FIG.3A
Prior Art

| | | | |
| --- | --- | --- | --- |
| 40 | 2 | 9 | COMMUNICATION CHECK ALARM |
| | | | |
| | | | |
| | | | |
| | | | |
| | | | |
| | | | |

FIG.3B

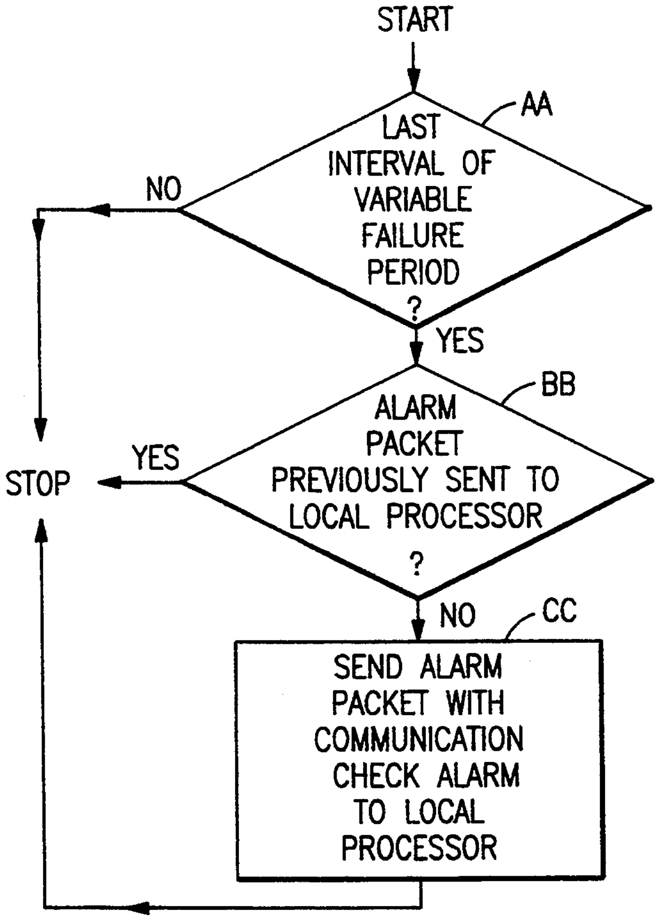

FIG.5

4:43:22 22-JUL-1993

WORKSTATION CONFIGURATION

MASTER RANGE FOR PERFORMANCE COLLECTION:

| | | | |
|---|---|---|---|
| FIRST REMS MASTER: | 1 | FIRST ORS MASTER: | 1 |
| LAST REMS MASTER : | 32000 | LAST ORS MASTER : | 32000 |

PHONE NUMBER FOR MODEM 1:
PHONE NUMBER FOR MODEM 2:

| | |
|---|---|
| FREQUENCY OF WORKSTATION BUZZER: | 1000 |
| RUN AUTOMATIC COMMUNICATION CHECK REPORT AT: | 0:00 |
| TRAPPED PASSENGER REMINDER AT THIS WORKSTATION ? | N |
| DISPLAY MODE (1=TEXT, 2=SEMI-GRAPHIC, 3=GRAPHIC): | 1 |

ESC = TERMINATE EDIT. ARROWS = CHANGE FIELD. <CR> = NEXT FIELD.

THIS NEW FIELD (RUN AUTOMATIC COMMUNICATION CHECK REPORT AT:) INDICATES AT WHICH TIME EACH DAY THE LOCAL IS TO GENERATE A LIST OF MASTERS THAT HAVE NOT INITIATED A COMMUNICATION IN ANY WAY WITH THE LOCAL.

FIG.7

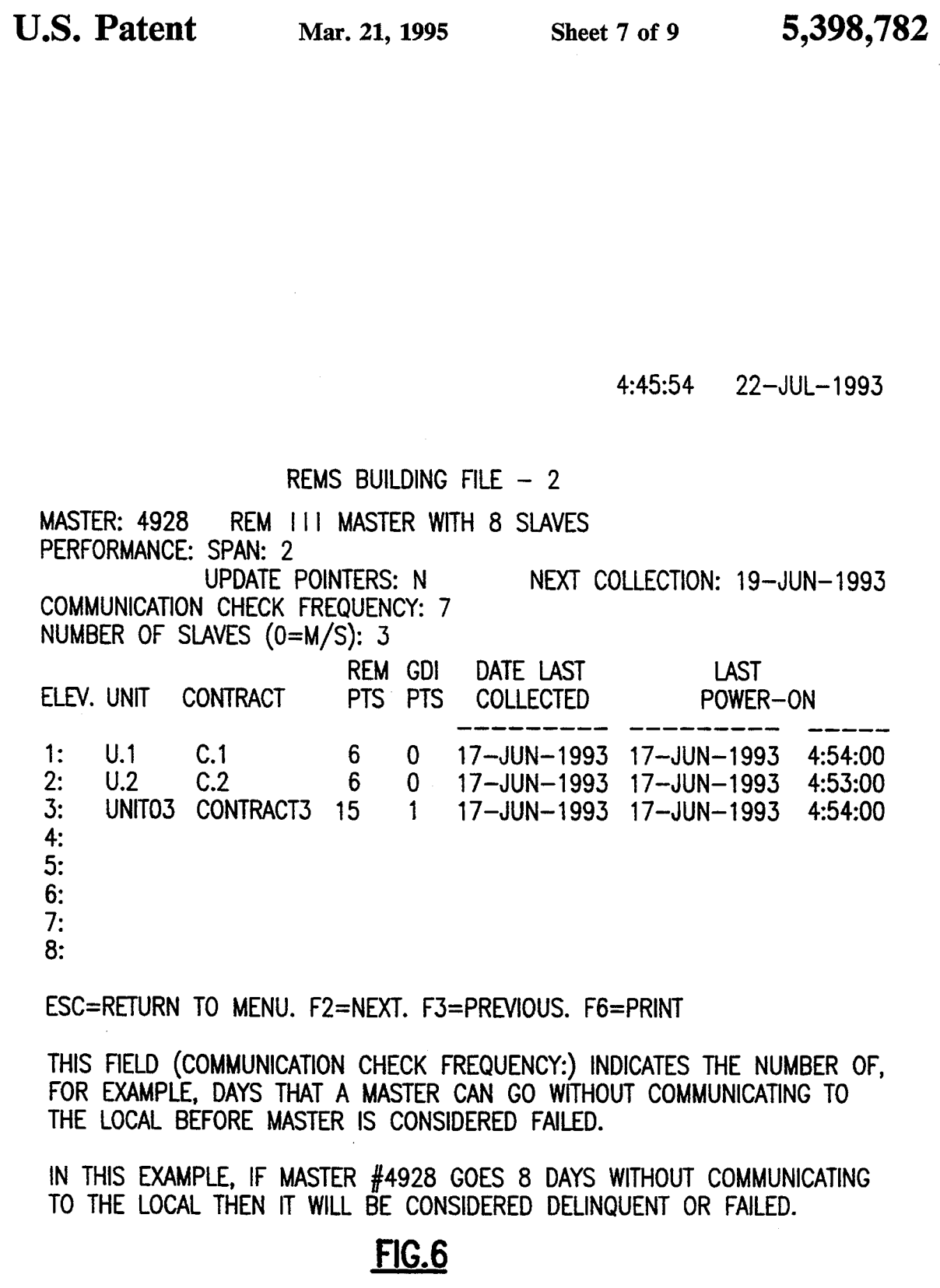

4:45:54 22-JUL-1993

REMS BUILDING FILE - 2

MASTER: 4928 REM III MASTER WITH 8 SLAVES
PERFORMANCE: SPAN: 2
UPDATE POINTERS: N NEXT COLLECTION: 19-JUN-1993
COMMUNICATION CHECK FREQUENCY: 7
NUMBER OF SLAVES (0=M/S): 3

| ELEV. | UNIT | CONTRACT | REM PTS | GDI PTS | DATE LAST COLLECTED | LAST POWER-ON | |
|---|---|---|---|---|---|---|---|
| 1: | U.1 | C.1 | 6 | 0 | 17-JUN-1993 | 17-JUN-1993 | 4:54:00 |
| 2: | U.2 | C.2 | 6 | 0 | 17-JUN-1993 | 17-JUN-1993 | 4:53:00 |
| 3: | UNIT03 | CONTRACT3 | 15 | 1 | 17-JUN-1993 | 17-JUN-1993 | 4:54:00 |
| 4: | | | | | | | |
| 5: | | | | | | | |
| 6: | | | | | | | |
| 7: | | | | | | | |
| 8: | | | | | | | |

ESC=RETURN TO MENU. F2=NEXT. F3=PREVIOUS. F6=PRINT

THIS FIELD (COMMUNICATION CHECK FREQUENCY:) INDICATES THE NUMBER OF, FOR EXAMPLE, DAYS THAT A MASTER CAN GO WITHOUT COMMUNICATING TO THE LOCAL BEFORE MASTER IS CONSIDERED FAILED.

IN THIS EXAMPLE, IF MASTER #4928 GOES 8 DAYS WITHOUT COMMUNICATING TO THE LOCAL THEN IT WILL BE CONSIDERED DELINQUENT OR FAILED.

FIG.6

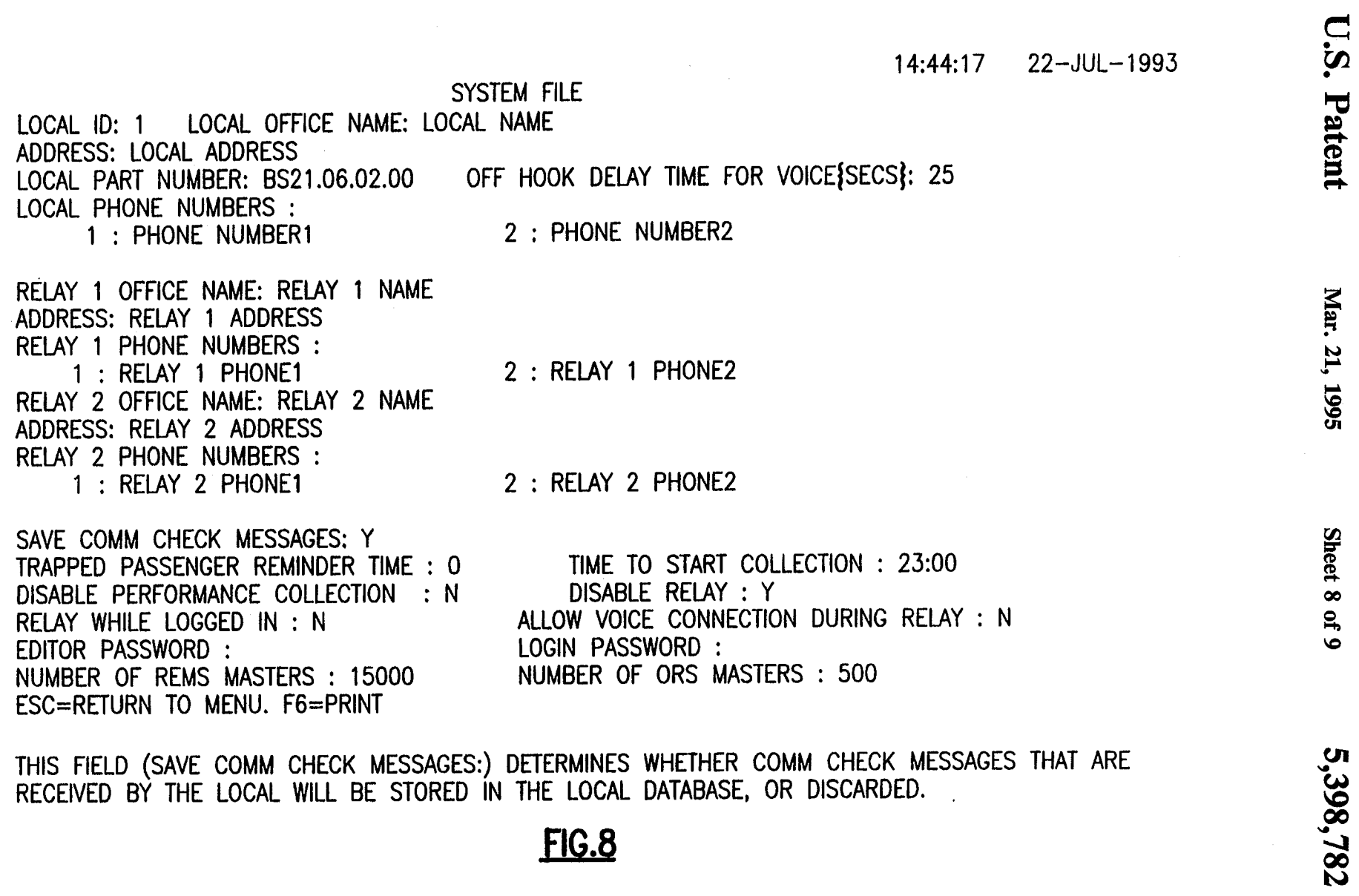

```
                                                      14:44:17    22-JUL-1993
                              SYSTEM FILE
LOCAL ID: 1    LOCAL OFFICE NAME: LOCAL NAME
ADDRESS: LOCAL ADDRESS
LOCAL PART NUMBER: BS21.06.02.00    OFF HOOK DELAY TIME FOR VOICE{SECS}: 25
LOCAL PHONE NUMBERS :
     1 : PHONE NUMBER1              2 : PHONE NUMBER2

RELAY 1 OFFICE NAME: RELAY 1 NAME
ADDRESS: RELAY 1 ADDRESS
RELAY 1 PHONE NUMBERS :
    1 : RELAY 1 PHONE1              2 : RELAY 1 PHONE2
RELAY 2 OFFICE NAME: RELAY 2 NAME
ADDRESS: RELAY 2 ADDRESS
RELAY 2 PHONE NUMBERS :
    1 : RELAY 2 PHONE1              2 : RELAY 2 PHONE2

SAVE COMM CHECK MESSAGES: Y
TRAPPED PASSENGER REMINDER TIME : 0        TIME TO START COLLECTION : 23:00
DISABLE PERFORMANCE COLLECTION  : N        DISABLE RELAY : Y
RELAY WHILE LOGGED IN : N              ALLOW VOICE CONNECTION DURING RELAY : N
EDITOR PASSWORD :                      LOGIN PASSWORD :
NUMBER OF REMS MASTERS : 15000         NUMBER OF ORS MASTERS : 500
ESC=RETURN TO MENU. F6=PRINT
```

THIS FIELD (SAVE COMM CHECK MESSAGES:) DETERMINES WHETHER COMM CHECK MESSAGES THAT ARE RECEIVED BY THE LOCAL WILL BE STORED IN THE LOCAL DATABASE, OR DISCARDED.

FIG.8

COMMUNICATION CHECK REPORT: 19-OCT-1992 17:55:48

| MASTER # | NAME | LAST DATE | EXPECTED DATE |
|---|---|---|---|
| 5 | OTIS ELEVATOR COMPANY-NAO | 11-SEP-1992 | ----------- |
| 10005 | 99 STATE STREET (LOWRISE) (NKB777777) | 10-OCT-1992 | 12-OCT-1992 |
| 25004 | NORM'S BUILDING (GL-333333) | 3-SEP-1992 | ----------- |
| 25001 | BUILDING HEIGHTS (GL-444444) | 15-OCT-1992 | 16-OCT-1992 |

TOTAL FAILED: 4 NUMBER OF REM III: 2 NUMBER OF REM II: 2

FIG.9

COMMUNICATION CHECK REPORT: 11-MAY-1993 11:28:9

| # | BUILDING NAME | LAST DATE | FREQ | EXPECTED DATE |
|---|---|---|---|---|
| 4547 | CORNER MASTER FOR PERF TEST | 23-MAR-1993 | 1 | ----------- |
| 4905 | COMMON MASTER | 15-APR-1993 | 1 | ----------- |
| 4922 | THE REM3 MASTER | 7-MAY-1993 | 1 | 10-MAY-1993 |
| 4928 | REMS 3 MASTER | 26-MAR-1993 | 1 | 10-MAY-1993 |
| 1111 | | 15-MAR-1993 | 7 | ----------- |
| 4916 | NICKS PRELIMINARY REM III TEST | 2-APR-1993 | 7 | 4-MAY-1993 |

TOTAL FAILED: 6 NUMBER OF REM III: 3 NUMBER OF REM II: 3

FIG.10

REMOTE MONITORING SYSTEM WITH VARIABLE PERIOD COMMUNICATION CHECK

FIELD OF THE INVENTION

The present invention relates to monitoring systems and, more particularly, to remote systems for electronically monitoring elevators.

BACKGROUND

It is well known to utilize remote elevator monitoring systems (REMS) for monitoring operating conditions in individual elevators in widely diverse locations. Examples of such systems are described, for example, in U.S. Pat. Nos. 4,568,909 and 4,662,538 which are hereby incorporated in their entireties by reference. As shown in FIG. 1 which corresponds to FIG. 1 of U.S. Pat. Nos. '909 and '538, each REM system during normal operation monitors individual elevators in remotely located buildings 12 (REM buildings), transmits alarm and performance information to associated local monitoring centers 14, and then can retransmit the alarm and performance information from the local centers to a central monitoring center 16. Each of the buildings 12 includes a master data processing system 18 and one or more slave data processing units 20 which together gather operational information about corresponding elevators and elevator shafts. The slaves 20 communicate with the master over lines 22. Each master includes an electronic processor (e.g., microprocessor) coupled to a volatile memory (e.g., RAM) and to a non-volatile memory (e.g., ROM, EEProm or the like). The non-volatile memory includes instructions for evaluating performance data and determining whether an alarm or alert condition exists according to Boolean logic equations (or a state machine model) which are coded within the software. The software is stored within the non-volatile memory and executed by the microprocessor.

Each master system 18 communicates with a modem 24 which permits transmission of alarm and performance data to a modem 26 in the associated local monitoring center 14. Typically, performance data (as opposed to alarm and/or alert data) is transmitted by the master 18 responsive to a specific request from the local monitoring center 14. The modem 26 exchanges information with a local data processor 28 which informs service personnel (e.g., service operator) of conditions in all of the associated elevators being monitored. Service personnel are informed (e.g., alerted) by means of any suitable output device(s) such as a display (CRT), a printer 30 and/or an audible warning device.

Each local 14 typically includes a suitably programmed personal computer system. As shown in FIG. 1A, each local data processor 28 includes an electronic processor (e.g., a microprocessor) coupled, via suitable buses etc., to a non-volatile memory (e.g., ROM, EEProm or FLASH EEProm), a volatile memory (e.g., RAM), various controllers and I/O ports. The processor 28 is coupled, via the I/O ports, to a mass storage device (e.g., DASD or hard disk), an input device (e.g., keyboard) and output device(s) such as a CRT or printer 30. The DASD memory includes instructions for receiving data (alarm, alert, performance) and also includes data (e.g., look-up table T-FIG. 3A) and instructions useful for determining the cause of an alarm and for causing notification of an alert or an alarm via the output devices. The local processor 28 alerts local personnel of these conditions via the printer 30 or CRT or other output device.

REMS of the type described have evolved with increasing sophistication and have found widespread use. REMs provide alarms quickly for response by local service personnel as well as providing other information indicative of impending degradation of the elevator system or potential harm or inconvenience to the passengers. It is important for service operators to have a means for early detection of REM masters that can no longer initiate transmissions (e.g., initiate phone calls and/or transmit a message signal packet P-FIG. 2) to the local processor 28. In line with such sophistication, it is known for the master to transmit daily performance data about elevators being monitored and for the local processor to cause the printer 30 to highlight the local monitoring center's computer printout in the event that a remote building does not call in daily. See, for example, U.S. Pat. No. 4,568,909, column 11, lines 35–53.

Although daily verification that a master is operational is useful, the present inventors believe that further improvements in the versatility and effectiveness of a remote monitoring system are achievable. For example, excessive costs and/or degraded performance may result from daily or frequent telecommunications call-in transmissions from a multiplicity of masters. In addition, the present inventors have discovered that daily call-in transmissions from a master after an initial installation shakedown period are unnecessary for certain types of buildings (e.g., apartment buildings) in order to maintain a satisfactory degree of confidence that the master for that building is operational. On the other hand, the present inventors have discovered that hospitals or other such critical locations require daily and possibly even more frequent communication checks of the masters for those critical locations.

According to the present invention, a monitoring system includes a master including an electronic processor coupled to a memory, a master communication means for permitting transmission of electronic message signals, a local processor including a local processor memory, the local processor is connected to an output device such as a CRT or a printer for displaying information corresponding to message signals and is also connected to an input device such as a keyboard for inputting certain data (e.g., a value) and instructions. The local processor memory includes instructions for assigning the value to a local variable (e.g., failure period) located in the memory, for determining if the failure period (threshold) for a particular master is exceeded, and for causing information identifying such master to be outputted on the output device (e.g., display) if the failure period is exceeded. According to an essential aspect of the present invention, the failure period is selectable and adjustable by a local operator within a range of, e.g., 0–365 days. Preferably, the range is 0–255 days. Of course, hours, weeks or months could be employed. Typically, the operator enters the value (e.g., a whole number) via the keyboard K. Optionally, each master system (e.g., in non-volatile memory) includes instructions for assigning the same value equal to a master variable (e.g., failure period) located in a memory of the master and for initiating a communication to the local at a particular time on the last interval (e.g., last day) of the failure period. Alternatively, each master system includes instructions for determining if an alarm has been sent to the local within the failure period, and, if not sent, to send a check alarm which verifies operation of the master.

It is a principal object of the present invention to increase the effectiveness of a remote monitoring system.

It is an additional object of the present invention to enhance the versatility of a remote elevator monitoring system.

It is a further object of the present invention to permit an operator to select or change a time period within which a master must communicate with a local or else the master is considered failed.

It is a further object of the present invention to permit an operator to select or vary the period for communication checks sent from a master within a remote building to a local monitoring center.

It is a still further object of the present invention to reduce telecommunications costs in a remote elevator monitoring system.

Further and still other objects of the present invention will become more readily apparent in light of the following detailed description when taken in conjunction with the accompanying drawing, in which:

BRIEF DESCRIPTION OF THE DRAWING

FIG. 2 is a diagram and explanatory legends for a typical prior art message packet sent as from a master to a local monitoring center;

FIG. 3A is a look-up table T showing prior art codes for alarm and alert messages, while FIG. 3B is an new entry to table T showing the codes and corresponding alert message according to the present invention;

FIG. 5 is a high level logic flow diagram of an optional routine according to the present invention, which is executed by the electronic processor of the master;

FIG. 6 is a diagram showing a screen display of a monitor in the local monitoring station, the display having a first field according the present invention;

FIG. 7 is a diagram showing a screen display of the monitor in the local monitoring station, the display having a second field according to an optional feature of the present invention;

FIG. 8 is a diagram showing a screen display of the monitor in the local monitoring station, the display having a third field according to another optional feature of the present invention;

FIG. 9 is a Report (e.g., printout) generated by the local monitoring center and displaying all masters which failed to communicate with the local center within the failure period selected by the local operator; and FIG. 10 is an alternate embodiment of the Report.

DETAILED DESCRIPTION OF THE PREFERRED EMBODIMENTS AND BEST MODE

Figure 1:
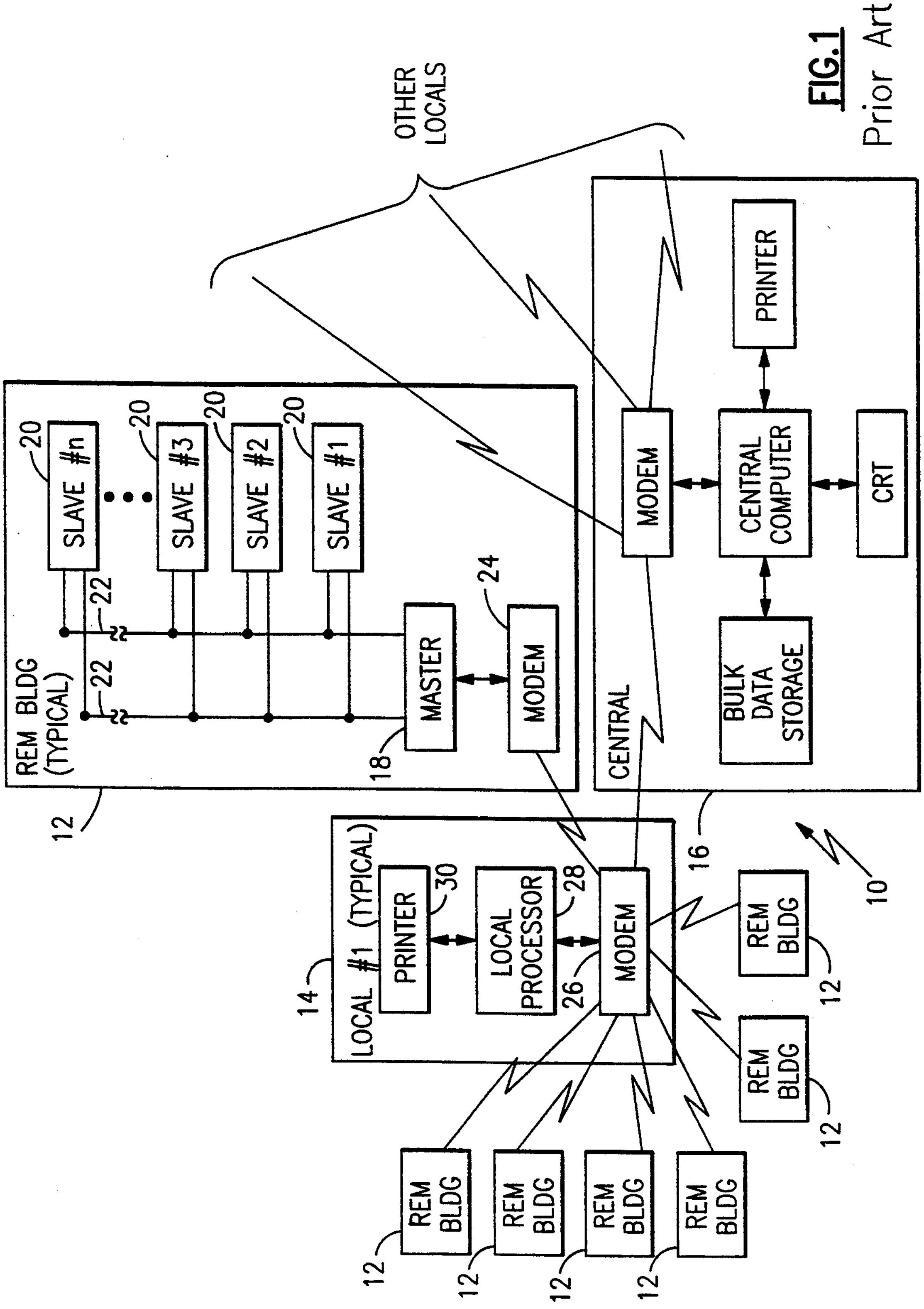
FIG. 1 Prior Art
FIG. 1 is a block diagram of a prior art remote elevator monitoring system in which the present invention may be implemented.
Figure 1A:
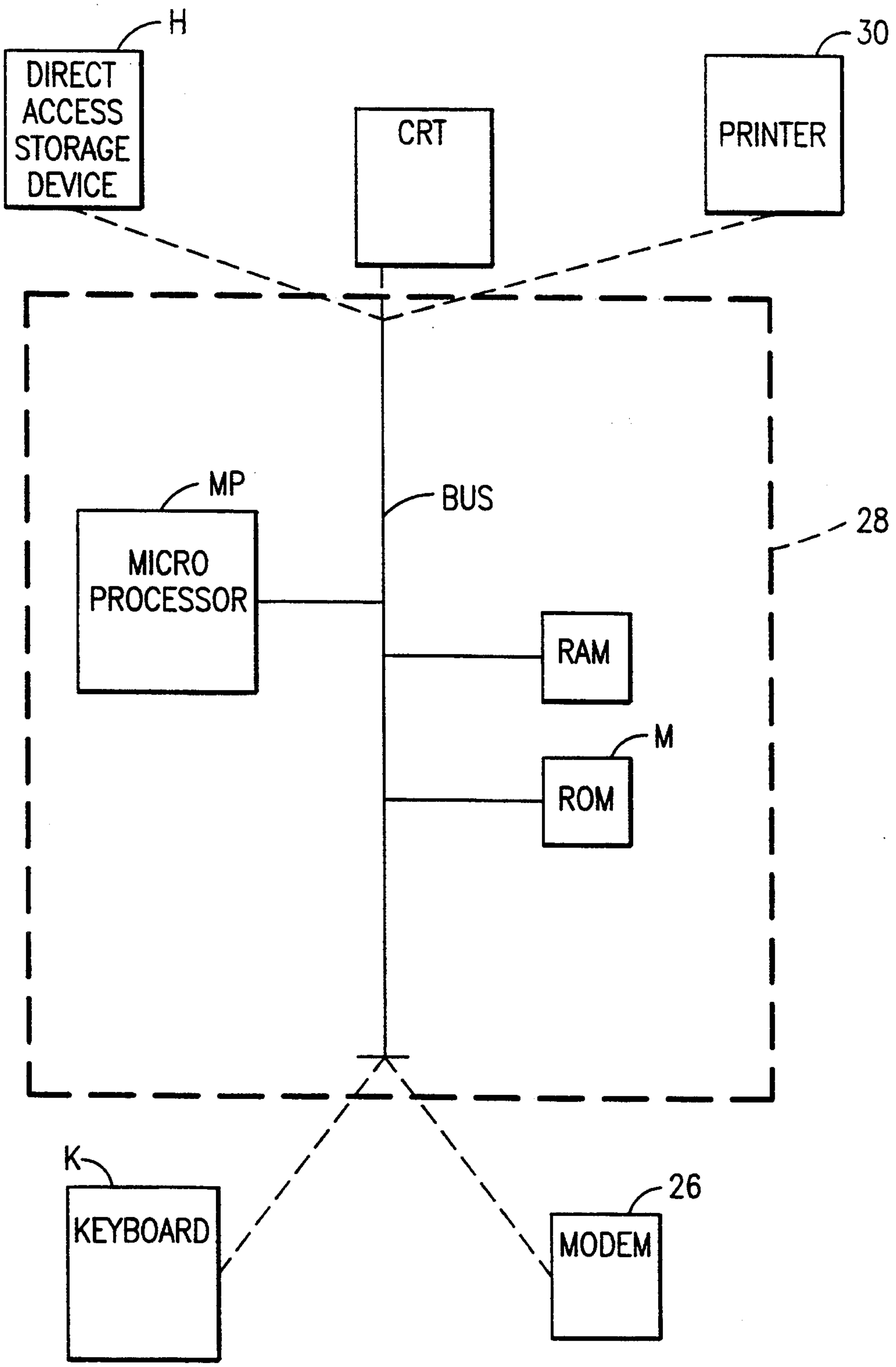
FIG. 1A Prior Art
FIG. 1A is a block schematic diagram of parts of a local monitoring center 14 comprising a personal computer system.

FIG. 1 shows a REM system according the prior art. In the prior art, in the event of an alarm or alert, a master 18 sends or transmits an alarm packet (FIG. 2) to a local processor 28 (FIG. 1A) via modems 24,26 and via any suitable communication links such as telephone lines (not shown). A prior art alarm signal packet P is shown in FIG. 2 with explanatory legends. For example, by any suitable programming well known in the art (See, e.g., FIGS. 2, 4 and 8 of U.S. Pat. No. 4,568,909), an alarm code of 1 hex and a fault code of 0 hex transmitted by the master 18 and received by the local processor 28 causes the local processor 28 to read a table T stored, for example, in a non-volatile memory—e.g., a direct access storage device such as a hardfile H. Such alarm code and fault code causes the processor to effect display of a number "1" and the alarm message "INOP 1 Elevator Power Signal Failure" (FIG. 3A) on a CRT (FIG. 1A).

Figure 4:
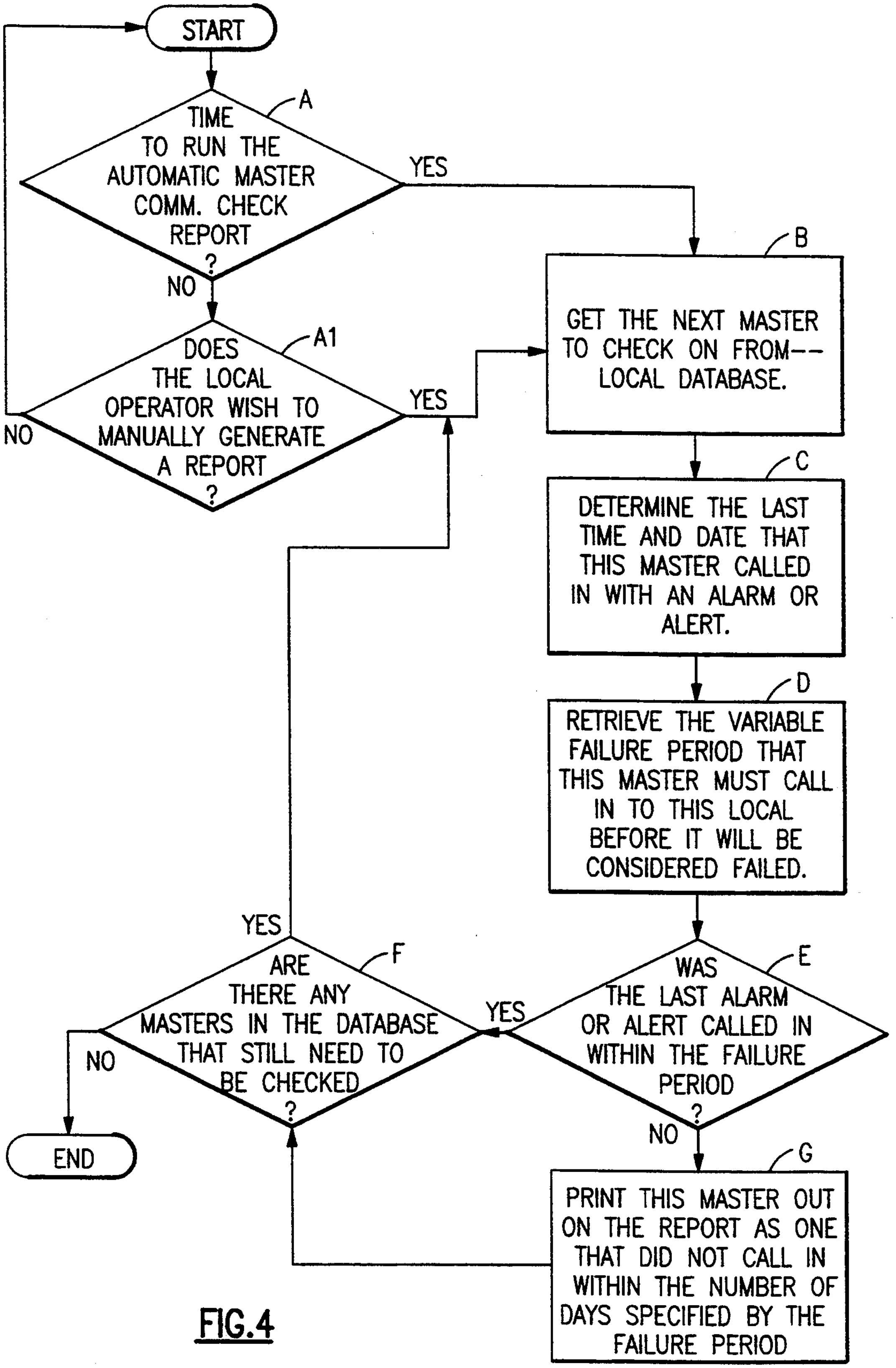
FIG. 4 is a high level logic flow diagram of a preferred routine according to the present invention which is executed by the electronic processor MP of the local processor.

According the invention, a routine, for example FIG. 4, is stored on the DASD H and is executed by the processor MP, (e.g., once every day). An appropriate time of the day can be suitably programmed into the local processor software to initiate execution of the program of FIG. 4. A screen display, for example, as shown in FIG. 7 is presented on the CRT display connected to the local processor 28. The operator inputs a value(s) into a field "Run Automatic Communication Check Report At: "—i.e. the appropriate time of day at which the report should be run for REM masters numbered 1 through 32,000. If "yes" in step A, the processor MP executes steps B, C, D, E. If "no" in step A, execute step A1. If "yes" in step E, a step F is executed. If "no" in step E, the processor 28 executes a step G. The steps of FIG. 4 are executed, for example, every 100 milliseconds until the step F results in a "no".

According to an essential aspect of the present invention, a failure period for each master is operator selectable, variable or changeable by the local human operator. For example, the range of allowable periods that an operator can enter to a local database (e.g., stored on the DASD) for any particular master is, for example, any period within a range of, e.g., 0–255 days. If an operator enters "0" days (e.g., through the keyboard k) for the period (or "frequency") of a particular master, then that particular master will not have to display the ability to initiate a phone call (e.g., send an alarm packet) to the local processor. However, if, for example, a period of seven "7" days is entered for a master number 4928 (See FIG. 6), then every at least once every seven days, the associated local 14 must receive at least one alarm or alert from the master number 4928. In this case, the operator inputs the number (value) "7" into the field "Communication Check Frequency: ") is inputted with the number "7" by the operator. If the local does not receive any alarms or alerts from master number 4928 within seven days, then the local operator will be made aware of the failure when the master communication check report FIG. 9 or FIG. 10 is generated at the local in the step G of FIG. 4.

FIG. 5 is a high level logic flow diagram of an optional feature of the instant invention. The routine of FIG. 5 is run, e.g. at any suitably programmed time once every day. If "7" for the "Frequency" the "Last Interval" is the $7^{th}$ day. The steps AA, BB, CC are programmed into a (e.g. non-volatile memory such as ROM or EEPROM) memory of the master. If step AA is "yes", execute step BB. If no in step BB, the master initiates a transmission—e.g., makes a phone call and transmits a message signal packet P to the local processor 28 (Step CC). The step BB is optional and may be omitted from the routine of FIG. 5. The message signal packet transmitted in this instance contains an alarm code of 40 hex and a fault code of 2 hex which corresponds to a communication check alarm. Suitable parts of the table T and the table of FIG. 3B are also suitably stored e.g., within ROM or EEProm of the master. Receipt of such a Communication Check Alarm would be stored in any suitable fashion, for example, in a suitably stored data table (on DASD) connected to the local processor 28 so that the query step E of FIG. 4 results in a "yes" for that particular master.

In Summary, 1) the local database (e.g., on hardfile H) includes code such that each Master has associated with it a period (frequency) within which that master must display the ability to initiate a phone call. The range of allowable periods that an operator can enter into the Local database (e.g., via field of FIG. 6) is any period within a range of 0–255 days or even of 0–365 days. Other periods such as hours, weeks or months can be programmed. If an operator enters "0" days for the period of a Master, then that particular Master will not have to display the ability to initiate a phone call. If, for example, a period of "7" days was entered, then every at least once every 7th day the local must receive at least one alarm or alert from that Master. If the Local does not receive any such alarms or alerts in 7 days, then the Local operator will be made aware of this failure when the automatic Communication Check Report is run (e.g., FIG. 9). The report indicates to the operator that, e.g., four Masters have been silent for too long and that further investigation must be done in order to determine if those Masters are still functioning properly.

2) Optionally, the REM Master is programmed (forced) to initiate a phone call (i.e., transmission of a signal packet P) to the Local once every, e.g., 0–255 days. See FIG. 5. The period within which it is forced to call the local will be determined by the period (e.g., 7) inputted by the operator at the local. The message sent every 7th day is an alarm. Any suitable programming well understood by those skilled in the art in view of the instant specification may be used to assign the failure period within the master memory. Upon reception of the alarm at the Local, text would be displayed to the operator indicating that the message is a Communication Check Alarm. The advantage that this forced message gives is a guarantee that as long as a REM Master still has the ability to initiate a phone call then at least one message will have been received by the Local during the time period defined by item 1.

The Local database is optionally modified to allow the operator to enter the time of day that he or she would like to automatically generate a report of Masters that have not initiated phone calls within their specified frequencies or periods. This item (FIG. 7) gives the local operator the ability to set the Local up to generate this report at any time of the day. By setting up the Local to generate this report overnight, the computer will be free to do the monitoring tasks that the operators wish to do during the day. If the Local operator enters time of 00:00, then the report feature will be disabled.

The Local also has an ability to generate a report of masters whenever an operator desires one. This is referred to as the manual report (Step A1). Some operators may only want a report once every several days, therefore they can disable the automatic report by entering a time of 00:00 and then run the manual when they wish.

The Local also has the ability to record the time and date of the last Master initiated phone call (and transmission of packet P) that is received (See FIG. 6). This information is recorded on a per Master basis, and will be used when the report is generated in order to determine if a Master has initiated a phone call within its specified frequency.

Finally, coding and otherwise implementing the present invention is well within the skill of the art in view of the present specification.

While there has been shown and described what is at present considered preferred embodiments of the present invention, it will be readily understood to those skilled in the art that various changes and modifications may be made herein without departing from the spirit and scope of the present invention which shall be defined only by the appending claims.

We claim:

1. A monitoring system, comprising:
- a building;
- an elevator located in said building;
- a master located in said building, said master including an electronic processor coupled to a memory;
- a master communication means, coupled to said master and located in said building, for permitting transmission of an electronic message signal;
- a local processor including a local electronic processor connected to a local processor memory;
- a local processor communication means, connected to said local processor and coupled to said master communication means, for permitting reception of the electronic message signal;
- an output device connected to said local electronic processor;
- an input device connected to said local electronic processor; said local processor, said local processor communication means, said output and input devices all being located outside of said building, and
- instructions, stored within said local processor memory, for determining if a failure period for said master is exceeded, and for causing information identifying said master to be displayed on said output device if said failure period is exceeded, said failure period being selectable by an operator of said input device during normal operation of said monitoring system;
- said failure period being a time period within which said local processor must receive a message signal from said master in order for said master to be deemed operational.

2. A monitoring system as claimed in claim 1, wherein said memory of said master includes instructions and data for causing a transmission of an electronic message signal to said local processor within said failure period.

3. A system as claimed in claim 1, wherein said failure period is any period between 0 and 365 days.

4. A system as claimed in claim 1, wherein said input device is a keyboard.

5. A system as claimed in claim 1, wherein said output device is a printer.

6. A system as claimed in claim 1, wherein said message signal includes a Communication Check Alarm message.

7. A system as claimed in claim 1, wherein such failure period is any period between 1 and 365 days.

* * * * *